United States Patent
Lynch et al.

(10) Patent No.: US 7,591,172 B2
(45) Date of Patent: Sep. 22, 2009

(54) METHOD AND SYSTEM FOR MISFIRE DETECTION

(75) Inventors: Marvin Lynch, Detroit, MI (US); Ningsheng Qiao, Troy, MI (US); Jack Szpytman, Dearborn, MI (US); Louis Liu, Bloomfield Hills, MI (US); Richard Gilbert, Livonia, MI (US); Alan Chewter, Ypsilanti, MI (US)

(73) Assignee: Temic Automotive of North America, Inc., Deer Park, IL (US)

( * ) Notice: Subject to any disclaimer, the term of this patent is extended or adjusted under 35 U.S.C. 154(b) by 0 days.

(21) Appl. No.: 11/691,762

(22) Filed: Mar. 27, 2007

(65) Prior Publication Data

US 2008/0250850 A1   Oct. 16, 2008

(51) Int. Cl.
  *G01M 15/11* (2006.01)
(52) U.S. Cl. .................................................. 73/114.05
(58) Field of Classification Search .............. 73/114.02, 73/114.03, 114.04, 114.05
See application file for complete search history.

(56) References Cited

U.S. PATENT DOCUMENTS

| | | | | |
|---|---|---|---|---|
| 5,542,291 | A | * | 8/1996 | James ..................... 73/114.05 |
| 5,804,711 | A | * | 9/1998 | Remboski et al. ........ 73/114.05 |
| 5,841,025 | A | * | 11/1998 | Remboski et al. ........ 73/114.05 |
| 5,862,506 | A | * | 1/1999 | Lynch et al. ................. 701/111 |
| 6,847,882 | B2 | * | 1/2005 | Miller et al. ................. 701/111 |
| 6,885,932 | B2 | | 4/2005 | Liu et al. |

* cited by examiner

*Primary Examiner*—Eric S McCall

(57) ABSTRACT

A method for determining a misfire condition includes receiving crankshaft acceleration data. The method further includes routing the received data through at least one of a plurality of processing paths and through a startup path and determining a crankshaft revolution count. The method further includes comparing the determined crankshaft accelerations over the determined revolution count to at least one threshold crankshaft acceleration value over the determined revolution count and determining a misfire condition from one of the startup path and the processing path based on the comparison.

20 Claims, 2 Drawing Sheets

100

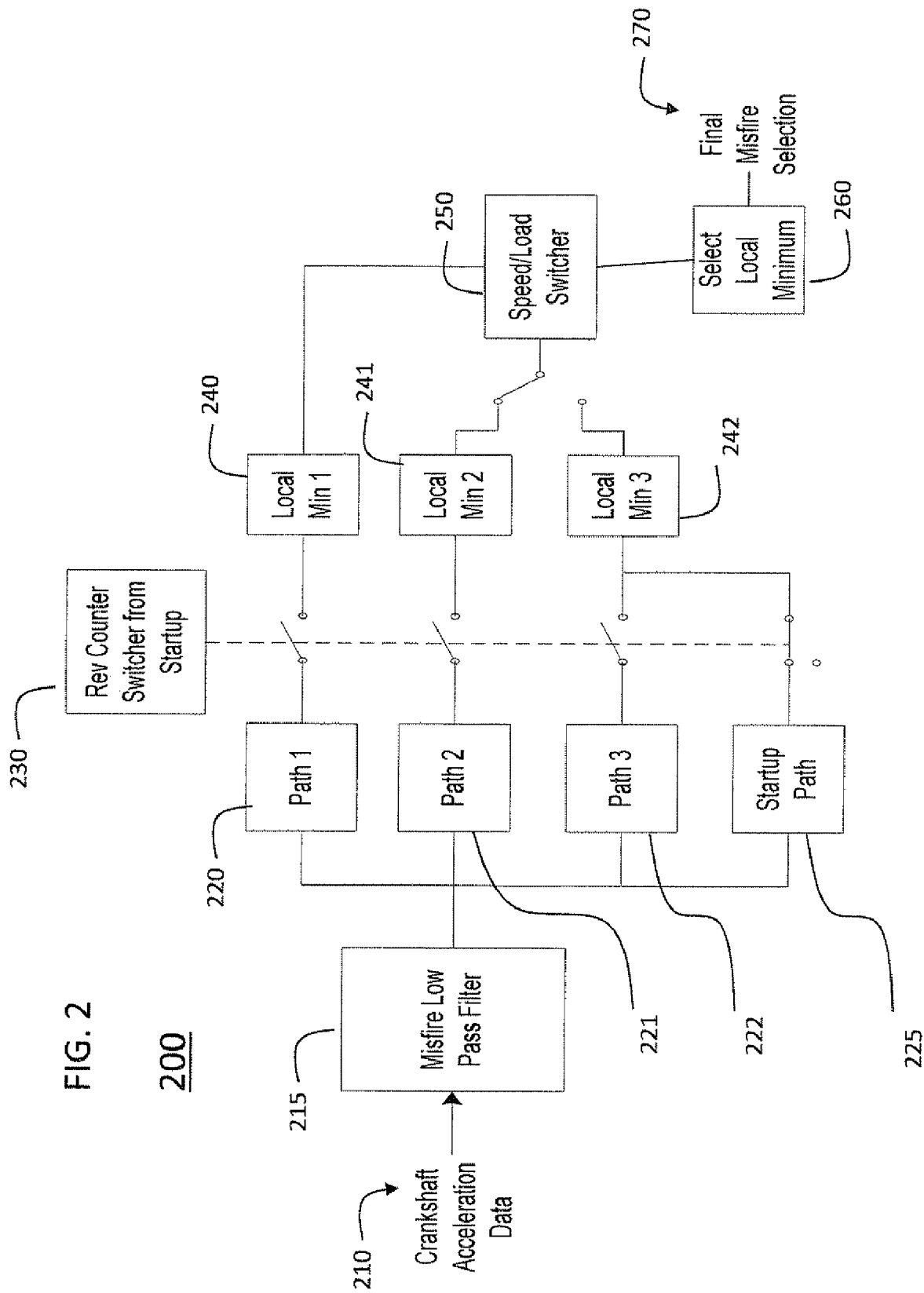

METHOD AND SYSTEM FOR MISFIRE DETECTION

TECHNICAL FIELD OF THE INVENTION

The present invention relates generally to engines and in particular to detection of engine misfires.

BACKGROUND OF THE INVENTION

Engine misfires occur in internal combustion engines when the fuel fails to entirely combust. Misfires are undesirable because misfires reduce fuel efficiency and engine power output. In addition, misfires can also contribute to emission levels, as uncombusted fuel released to the atmosphere contains higher levels of particulate matter and Volatile Organic Compounds ("VOC") than combusted fuel.

Previous attempts to detect misfires have focused on certain characteristics that result from misfires, such as changes in crankshaft speed, wheel speed, and the like. These attempts seek to detect misfires based on events external to the engine and filter the inputs and perform algorithmic computations on the data to reduce or eliminate the false detections of misfire. Such attempts receive data input, such as crankshaft speed, filter and modify the data based on the algorithm, and determine a misfire based on the modified data using a comparison based on earlier data. These approaches often feature "filter switching" techniques in which a series of filters are applied to the data, and the filtered output serves as a basis for the misfire determination. Filter switching techniques rely on filter coefficient swapping and buffer purging, each of which require time, computational power, and/or destruction of data.

However, prior methods of detecting misfires, while eliminating false positives, rely on a certain level of data to test each input. This data is generally developed in real time, and during a startup operation, such as the first few crankshaft revolutions on startup, the data is ineffective to determine a misfire accurately. Government regulations require monitoring misfires no later than the end of the second crankshaft revolution after engine start, and identify which cylinder generated the misfire. However, previous solutions have required use of monitor buffers to accumulate a sufficient data store for determination of the misfire.

Therefore, it would be desirable to provide a method and system of detecting a misfire that would overcome the aforementioned and other disadvantages.

SUMMARY OF THE INVENTION

One aspect of the invention provides a method for determining a misfire condition that includes receiving crankshaft acceleration data. The method further includes routing the received data through at least one of a plurality of processing paths and through a startup path and determining a crankshaft revolution count. The method further includes comparing the determined crankshaft accelerations over the determined revolution count to threshold crankshaft acceleration values over the determined revolution count and determining a misfire condition from one of the startup path and the processing path based on the comparison.

Another aspect of the invention provides a computer readable medium including computer readable code for determining a misfire condition that includes computer readable code for receiving crankshaft acceleration data. The medium further includes computer readable code for routing the received data through at least one of a plurality of processing paths and through a startup path and computer readable code for determining a crankshaft revolution count. The medium further includes computer readable code for comparing the determined crankshaft accelerations over the determined revolution count to threshold crankshaft acceleration values over the determined revolution count and computer readable code for determining a misfire condition from one of the startup path and the processing path based on the comparison.

Yet another aspect of the invention provides a system for determining a misfire condition that includes means for receiving crankshaft acceleration data. The system further includes means for routing the received data through at least one of a plurality of processing paths and through a startup path and means for determining a crankshaft revolution count. The system further includes means for comparing the determined crankshaft accelerations over the determined revolution count to threshold crankshaft acceleration values over the determined revolution count and means for determining a misfire condition from one of the startup path and the processing path based on the comparison.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE DRAWINGS

FIG. 2 illustrates one embodiment of a block diagram for detecting a misfire condition, in accordance with one aspect of the invention.

DETAILED DESCRIPTION OF THE PRESENTLY PREFERRED EMBODIMENTS

Figure 1:
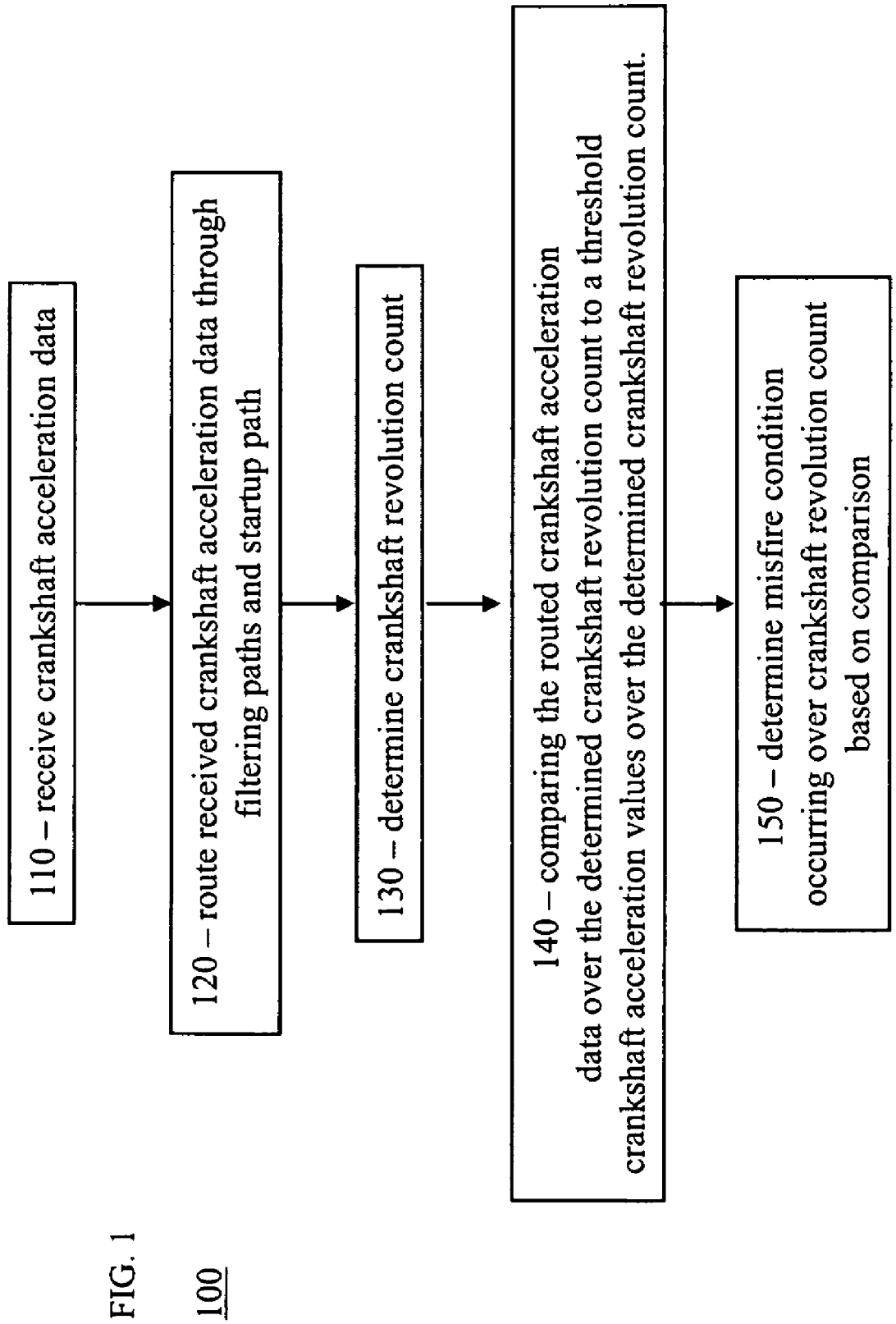
FIG. 1 illustrates one embodiment of a method for detecting a misfire condition, in accordance with one aspect of the invention.

FIG. 1 illustrates one embodiment of a method 100 for determining a misfire condition, in accordance with one aspect of the invention. Crankshaft acceleration data is received at step 110. The crankshaft acceleration data can be received directly from a crankshaft acceleration sensor, an engine controller, digital signal processing device, or other indirect source. In one embodiment, the crankshaft acceleration data is received at an engine controller. Any appropriate crankshaft acceleration sensor can be used, including sensors that measure acceleration using velocity.

In one embodiment, the crankshaft acceleration data is filtered prior to further processing. Filtering the data signal can improve system performance by reducing inaccuracy introduced by outlier signals and, depending on implementation, by focusing data processing on certain portions, such as high or low frequency and/or amplitude signals. In one embodiment, the filter is a low pass filter. In other embodiments, the filter is a high pass filter. In another embodiment, the filter is a finite impulse response (FIR) filter.

The received crankshaft acceleration data is routed to at least one of a plurality of processing paths and through a startup path at step 120. The plurality of processing paths operate on the crankshaft acceleration data to determine a local minimum value that serves as a basis for the determination of a misfire condition, and for which cylinder had the misfire condition. Each of the processing paths is calibrated to detect a misfire under particular conditions. For example, one processing path is calibrated for random misfires, another processing path is calibrated for single misfire conditions, and another processing path is calibrated for multiple misfire conditions. In one embodiment, each path has a distinct algorithm for detecting a local minimum value. In other embodiments, each path comprises a distinct algorithm for detecting a local minimum responsive to operating conditions, such as high speed, low speed, rough road, or the like. The startup path is a signal processing path calibrated to detect a misfire with a smaller set of data generated by prior data. In one embodiment, the startup path and each of the processing paths are in parallel with each other. In other embodiments, a switcher can disable or enable particular processing paths responsive to a particular crankshaft speed or other such mechanical condition.

In one embodiment, routing the received crankshaft acceleration data through at least one of a plurality of processing paths and through a startup path includes modifying the received data using at least one startup algorithm based on the startup path and modifying the received data using at least one filtering algorithm based on the processing path. Exemplary algorithms for processing data with the processing paths are disclosed in U.S. Pat. No. 6,885,932, the entirety of which is incorporated herein by reference. The startup algorithm, in one embodiment, comprises a FIR configured for operation using few data points.

The crankshaft revolution count is determined at step 130. The crankshaft revolution count reflects the number of revolutions of the crankshaft between a set time and the observation time. In one embodiment, the set time is marked to the time of ignition so that the crankshaft revolution count measures the number of revolutions since ignition.

The routed crankshaft accelerations over the determined revolution count is compared to threshold crankshaft acceleration values over the determined revolution count at step 140. The threshold crankshaft revolution count is a predetermined number based on data set requirements for determining a misfire condition. In one embodiment, the threshold crankshaft revolution count is two. In one embodiment, the threshold crankshaft revolution count is three. In another embodiment, the threshold crankshaft revolution count is four. In another embodiment, the threshold crankshaft revolution count is five. In another embodiment, the threshold crankshaft revolution count is measured in half revolutions, such as 2½, 3½, 4½, or the like. Any appropriate number of crankshaft revolution counts can be used, so long as the threshold results in sufficient data sets to support the processing applied to the data.

Based on the comparison, method 100 determines a misfire condition from one of the startup path and the plurality of processing paths at step 150. In one embodiment, the misfire condition is determined based on the processing path when the determined crankshaft accelerations over the determined revolution count exceeds the threshold crankshaft acceleration values over the determined revolution count and determined based on the startup path when the threshold crankshaft accelerations over the determined revolution count exceeds the determined crankshaft acceleration values over the determined revolution count. In one embodiment, the term "exceeds" includes both "greater than" as well as "greater than or equal to" while in other embodiments, the term "exceeds" means only "greater than." In one embodiment, the misfire detection is based on determining a local minimum of the crankshaft acceleration data as processed by at least one of the processing paths or the startup path.

In one embodiment, the startup path is configured to run continuously without regard to the crankshaft revolution count. In other embodiments, when the determined crankshaft accelerations over the determined revolution count exceeds the threshold crankshaft acceleration values over the determined revolution count, the startup path is disabled. In embodiments that disable the startup path, the utilization of computational resources can be increased.

Based on the misfire detection, the misfiring cylinder can be disabled, adjusted, reconfigured, or undergo other such remedial action.

FIG. 2 illustrates a high level circuit diagram illustrative of a circuit 200 for determining a misfire condition, in accordance with one aspect of the invention. Crankshaft acceleration data 210 is fed into a misfire low pass filter 215, and the filtered crankshaft acceleration data is routed in parallel through first path 220, second path 221, and third path 222 as well as startup path 225. Each of the first path 220, second path 221, third path 222, and startup path 225 operate using distinct coefficients and/or algorithms tuned for a certain calibration. A crankshaft revolution count is determined by a revolution counter switcher from startup 230 to include, or exclude, at least one of the startup path and first path 220, second path 221, and third path 222 from determination of a local minimum and misfire. The local minimum of the first path 220, second path 221, third path 222, and/or startup path 225 is determined at detectors 240, 241, and 242, and a speed/load switcher 250 controls selections responsive to other external vehicle conditions (speed, road conditions, vehicle weight, etc.). Based on these factors, a true local minimum is determined at selector 260, and the final misfire detection is made at 270.

While the teachings of this disclosure are applicable in any operating environment, it is anticipated that one operating environment is automotive, especially in engine controllers. It is important to note that the figures and description illustrate specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of determining a misfire condition, the method comprising:

receiving crankshaft acceleration data;

routing the received crankshaft acceleration data through at least one of a plurality of processing paths and through a startup path;

determining a crankshaft revolution count;

comparing the routed crankshaft acceleration data over the determined crankshaft revolution count to a threshold crankshaft acceleration values over the determined crankshaft revolution count; and determining a misfire condition from one of the startup path and the processing path based on the comparison.

2. The method of claim 1 wherein determining the misfire condition based on the comparison comprises:

determining the misfire condition based on the processing path when the determined crankshaft acceleration data over the determined crankshaft revolution count exceeds the threshold crankshaft acceleration values over the determined crankshaft revolution count; and determining the misfire condition based on the startup path when the threshold crankshaft acceleration values over the determined revolution count exceeds the determined crankshaft acceleration data over the determined crankshaft revolution count.

3. The method of claim 1 wherein determining a misfire condition comprises determining a local minimum of the crankshaft acceleration data as processed by at least one of the processing paths or the startup path.

4. The method of claim 1 further comprising:
disabling the startup path when the determined crankshaft accelerations over the determined revolution count exceeds the threshold crankshaft acceleration values over the determined revolution count.

5. The method of claim 1 further comprising:
filtering the received crankshaft acceleration data.

6. The method of claim 1 wherein the plurality of processing paths and a startup path are in parallel.

7. The method of claim 1 wherein routing the received data through at least one of a plurality of processing paths and through a startup path comprises:
modifying the received data using at least one startup algorithm based on the startup path; and
modifying the received data using at least one filtering algorithm based on the processing path.

8. A computer usable medium storing a computer program including computer program code for determining a misfire condition, the medium comprising:
computer program code for receiving crankshaft acceleration data;
computer program code for routing the received data through at least one of a plurality of processing paths and through a startup path;
computer program code for determining a crankshaft revolution count;
computer program code for comparing the routed crankshaft acceleration data over the determined crankshaft revolution count to a threshold crankshaft acceleration values over the determined crankshaft revolution count; and
computer program code for determining a misfire condition from one of the startup path and the processing path based on the comparison.

9. The medium of claim 8 wherein computer program code for determining the misfire condition based on the comparison comprises:
computer program code for determining the misfire condition based on the processing path when the determined crankshaft acceleration data over the determined crankshaft revolution count exceeds the threshold crankshaft acceleration values over the determined crankshaft revolution count; and
computer program code for determining the misfire condition based on the startup path when the threshold crankshaft acceleration values over the determined revolution count exceeds the determined crankshaft acceleration data over the determined crankshaft revolution count.

10. The medium of claim 8 wherein computer program code for determining a misfire condition comprises computer program code for determining a local minimum of the crankshaft acceleration data as processed by at least one of the processing oaths or the startup oath.

11. The medium of claim 8 further comprising:
computer program code for disabling the startup path when the computer crankshaft accelerations over the determined revolution count exceeds the threshold crankshaft acceleration values over the determined revolution count.

12. The medium of claim 8 further comprising:
computer program code for filtering the received crankshaft acceleration data.

13. The medium of claim 8 wherein the plurality of processing paths and a startup path are in parallel.

14. The medium of claim 8 wherein computer program code for routing the received data through at least one of a plurality of processing paths and through a startup path comprises:
computer program code for modifying the received data using at least one startup algorithm based on the startup path; and
computer program code for modifying the received data using at least one filtering algorithm based on the processing path.

15. A system for determining a misfire condition, comprising:
means for receiving crankshaft acceleration data;
means for routing the received data through at least one of a plurality of processing paths and through a startup path;
means for determining a crankshaft revolution count;
means for comparing the routed crankshaft acceleration data over the determined crankshaft revolution count to a threshold crankshaft acceleration values over the determined crankshaft revolution count; and
means for determining a misfire condition from one of the startup path and the processing path based on the comparison.

16. An engine controller comprising:
computer program code for receiving crankshaft acceleration data;
computer program code for routing the received data through at least one of a plurality of processing paths and through a startup path;
computer program code for determining a crankshaft revolution count;
computer program code for comparing the routed crankshaft acceleration data over the determined crankshaft revolution count to a threshold crankshaft acceleration values over the determined crankshaft revolution count; and
computer program code for determining a misfire condition from one of the startup path and the processing path based on the comparison.

17. The controller of claim 16 wherein the plurality of processing paths and a startup path are in parallel.

18. The controller of claim 16 wherein routing the received data through at least one of a plurality of processing paths and through a startup path comprises:
modifying the received data using at least one startup algorithm based on the startup path; and
modifying the received data using at least one filtering algorithm based on the processing path.

19. The controller of claim 16 wherein determining the misfire condition based on the comparison comprises:
determining the misfire condition based on the processing path when the determined crankshaft acceleration data over the determined crankshaft revolution count exceeds the threshold crankshaft acceleration values over the determined crankshaft revolution count; and determining the misfire condition based on the startup path when the threshold crankshaft acceleration values over the determined revolution count exceeds the determined crankshaft acceleration data over the determined crankshaft revolution count.

20. The controller of claim 16 further comprising:

disabling the startup path when the determined crankshaft accelerations over the determined revolution count exceeds the threshold crankshaft acceleration values over the determined revolution count.

* * * * *